United States Patent
Coffey et al.

(10) Patent No.: US 9,848,423 B2
(45) Date of Patent: *Dec. 19, 2017

(54) WIRELESS COMMUNICATION SYSTEM AND ASSOCIATED WIRELESS COMMUNICATION METHOD

(71) Applicant: Realtek Semiconductor Corp., HsinChu (TW)

(72) Inventors: John Timothy Coffey, San Francisco, CA (US); Der-Zheng Liu, Hsinchu County (TW)

(73) Assignee: Realtek Semiconductor Corp., HsinChu (TW)

(*) Notice: Subject to any disclaimer, the term of this patent is extended or adjusted under 35 U.S.C. 154(b) by 88 days.

This patent is subject to a terminal disclaimer.

(21) Appl. No.: 14/864,891

(22) Filed: Sep. 25, 2015

(65) Prior Publication Data
US 2016/0128062 A1 May 5, 2016

Related U.S. Application Data

(60) Provisional application No. 62/073,028, filed on Oct. 31, 2014, provisional application No. 62/180,038, filed on Jun. 15, 2015.

(51) Int. Cl.
*H04J 3/00* (2006.01)
*H04W 72/04* (2009.01)
*H04W 74/06* (2009.01)

(52) U.S. Cl.
CPC ....... *H04W 72/0446* (2013.01); *H04W 74/06* (2013.01)

(58) Field of Classification Search
CPC ........ H04W 88/04; H04W 52/34; H04L 47/14
USPC ........................................................ 370/336
See application file for complete search history.

(56) References Cited

U.S. PATENT DOCUMENTS

| | | | |
|---|---|---|---|
| 6,717,916 B1* | 4/2004 | Ahn | H04L 47/14 370/252 |
| 6,963,549 B1 | 11/2005 | Jayaraman | |
| 7,406,327 B2* | 7/2008 | Kroon | H04W 52/346 370/328 |
| 9,648,613 B2 | 5/2017 | Choi | |
| 9,706,551 B2 | 7/2017 | Jeong | |

(Continued)

FOREIGN PATENT DOCUMENTS

| CN | 1770731 A | 5/2006 |
|---|---|---|
| CN | 1820436 A | 8/2006 |

(Continued)

OTHER PUBLICATIONS

John Timothy Coffey et al., Title: Wireless Communication System and Associated Wireless Communication Method and Wireless Device, pending U.S. Appl. No. 15/452,697, filed Mar. 7, 2017.

*Primary Examiner* — Chi H Pham
*Assistant Examiner* — Alexander O Boakye
(74) *Attorney, Agent, or Firm* — Winston Hsu

(57) ABSTRACT

A wireless communication system includes an access point and at least one station, wherein when the access point operates in a setup mode, both the access point and station confirm a specific time slot for transmitting a packet from the station to the access point; and when the access point operates in a data mode following the setup mode, the station directly uses the specific time slot determined in the setup mode to transmit the packet to the access point.

19 Claims, 11 Drawing Sheets

(56) References Cited

U.S. PATENT DOCUMENTS

| | | |
|---|---|---|
| 2006/0239272 A1 | 10/2006 | Heidari-Bateni |
| 2008/0089311 A1 | 4/2008 | Roy |
| 2008/0259895 A1 | 10/2008 | Habetha |
| 2011/0222517 A1* | 9/2011 | Ishii ................ H04W 88/04 370/338 |
| 2013/0195036 A1 | 8/2013 | Quan |
| 2014/0003414 A1 | 1/2014 | Choudhury |
| 2014/0198642 A1 | 7/2014 | Barriac |
| 2014/0334458 A1 | 11/2014 | Park |
| 2015/0049644 A1 | 2/2015 | Lee |
| 2015/0117365 A1 | 4/2015 | Merlin |
| 2015/0131570 A1 | 5/2015 | Kwon |
| 2015/0334742 A1 | 11/2015 | Kim |
| 2015/0382283 A1 | 12/2015 | Wang |
| 2016/0073433 A1 | 3/2016 | Kwon |
| 2016/0088665 A1 | 3/2016 | Kim |
| 2016/0128061 A1 | 5/2016 | Coffey |
| 2016/0249383 A1 | 8/2016 | Kwon |

FOREIGN PATENT DOCUMENTS

| | | |
|---|---|---|
| CN | 1996813 A | 7/2007 |
| CN | 100505730 C | 6/2009 |
| CN | 101730282 A | 6/2010 |

* cited by examiner

WIRELESS COMMUNICATION SYSTEM AND ASSOCIATED WIRELESS COMMUNICATION METHOD

CROSS REFERENCE TO RELATED APPLICATIONS

This application claims the priority of U.S. Provisional Application No. 62/073,028, filed on Oct. 31, 2014, and U.S. Provisional Application No. 62/180,038, filed on Jun. 15, 2015, which is included herein by reference in its entirety.

BACKGROUND OF THE INVENTION

1. Field of the Invention

The present invention relates to a wireless communication system, and more particularly, to an access method between an access point and one or more stations of the wireless communication system.

2. Description of the Prior Art

Many wired and wireless networks enable multiple access using distributed channel access mechanisms. In a typical instantiation, such as that used in the IEEE 802.11 set of protocols, devices that share access to the wireless medium, and that wish to transmit, will independently choose a number of transmission-available time slots (a 'backoff') to delay before attempting to transmit a packet. A new backoff is chosen for each new packet. Each device's new backoff is randomly (or pseudo-randomly) chosen from a set of possible backoffs determined by the protocol. Different devices will (usually) choose different backoffs (because the backoff choices are made independently on each transmitter), and then the devices will not attempt to transmit at the same time. In this way the protocol allows for different devices that implement the same underlying protocol to transmit at different times, without any explicit sequence of negotiation or arbitration messages. This is a "distributed" coordination channel access mechanism.

However, two or more devices may choose the same backoff value. In this case a "collision" will occur.

For this distributed coordination system to work effectively, the number of available backoff slots must be appreciably greater than the number of different devices actively seeking to transmit at a given time. First, unless there are as many available backoff slots as devices actively seeking to transmit, it will be impossible for each device to choose a different backoff slot. Secondly, if the number of devices actively seeking to transmit is large, and the number of backoff slots equals only slightly exceeds the number of devices, it will be highly improbable for a satisfactory outcome to occur.

As one example, if the same K available backoff slots are available for each of N devices actively seeking to transmit, then the probability that the backoff slot that is chosen by a given device is not chosen by any of the other devices is $(1-1/K)^{N-1}$. If $K=r*N$, and N is large, this is approximately $e^{-1/r}$. For this probability to exceed 0.9 (so that the probability that this device will be involved in a collision in its next transmission will be lower than 0.1), r should be at least 9.5: that is, there should be at least 9.5 times as many available backoff slots as devices actively seeking to transmit. For this probability to exceed 0.95 (so that the probability that this device will be involved in a collision in its next transmission will be lower than 0.05), r should be at least 19.5. This in turn causes many backoff slots to go unused, lowering overall network throughput.

Since the loss of overall network throughput due to a collision (loss of use of the shared medium for the duration of the longest packet that any of the colliding devices transmits) usually exceeds the loss due a backoff slot going unused (loss of use of the shared medium for the duration of the backoff slot), it is generally desirable to make the probability of a collision correspondingly lower, requiring an increased ratio r of available backoff slots to number of devices actively seeking to transmit, and lowering overall network throughput.

Alternatively, a common procedure used in wireless systems is for the transmitter to send an initial short packet announcing the proposed/desired duration of the current frame exchange sequence and for the receiver to respond declaring the wireless medium apparently free for that duration, followed by the actual data transmission. In this way, a collision between two or more transmitters employing this strategy will only cause a futilely busy wireless medium for the duration of the initial short packet, rather than the (possibly much longer) duration of the intended data packet. In the IEEE 802.11 protocol, the initial short packet is a "Request-to-Send" ("RTS") packet. This common strategy mitigates some of the negative effects of a collision, but at the cost of additional protocol overhead, since where there is no collision the protocol requires the additional full exchange (in IEEE 802.11, an RTS, followed by a short inter-frame space ("SIFS"), followed by a "Clear-to-Send" ("CTS"), followed by another SIFS), which comprises significant non-data-carrying overhead, which it is desirable to avoid. The method of the present invention may additional be used, without limitation, to comprise this and other sources of protocol overhead that arise from the possibility of collisions in the baseline CSMA/CA (carrier sense multiple access with collision avoidance) system.

SUMMARY OF THE INVENTION

It is therefore an objective of the present invention to provide a protocol for a mode of operation and/or an access method between an access point and a station of the wireless communication system, which may decrease the collision probability to improve overall network throughput without using a large contention window (i.e. without using too many K available backoff slots), to solve the above-mentioned problems.

According to one embodiment of the present invention, a wireless communication system comprises an access point and at least one station, wherein when the access point operates in a setup mode, both the access point and station establish a specific time slot for transmitting a packet from the station to the access point; and when the access point operates in a data mode following the setup mode, the station directly uses the specific time slot determined in the setup mode to transmit the packet to the access point.

According to another embodiment of the present invention, a wireless communication method comprises: in a setup mode of an access point, establishing a specific time slot for transmitting a packet from a station to the access point; and in a data mode following the setup mode of the access point, directly using the specific time slot determined in the setup mode to transmit the packet from the station to the access point.

According to another embodiment of the present invention, a wireless communication method of a station comprises: establishing a specific time slot with an access point in a setup mode; and directly using the specific time slot determined in the setup mode to transmit a packet to the access point in a data mode.

According to another embodiment of the present invention, a wireless communication method of a station comprises: operating in a setup mode to establish a specific time slot with a station in a setup mode; and operating in a data mode following the setup mode to receive a packet from the station at the specific time slot determined in the setup mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
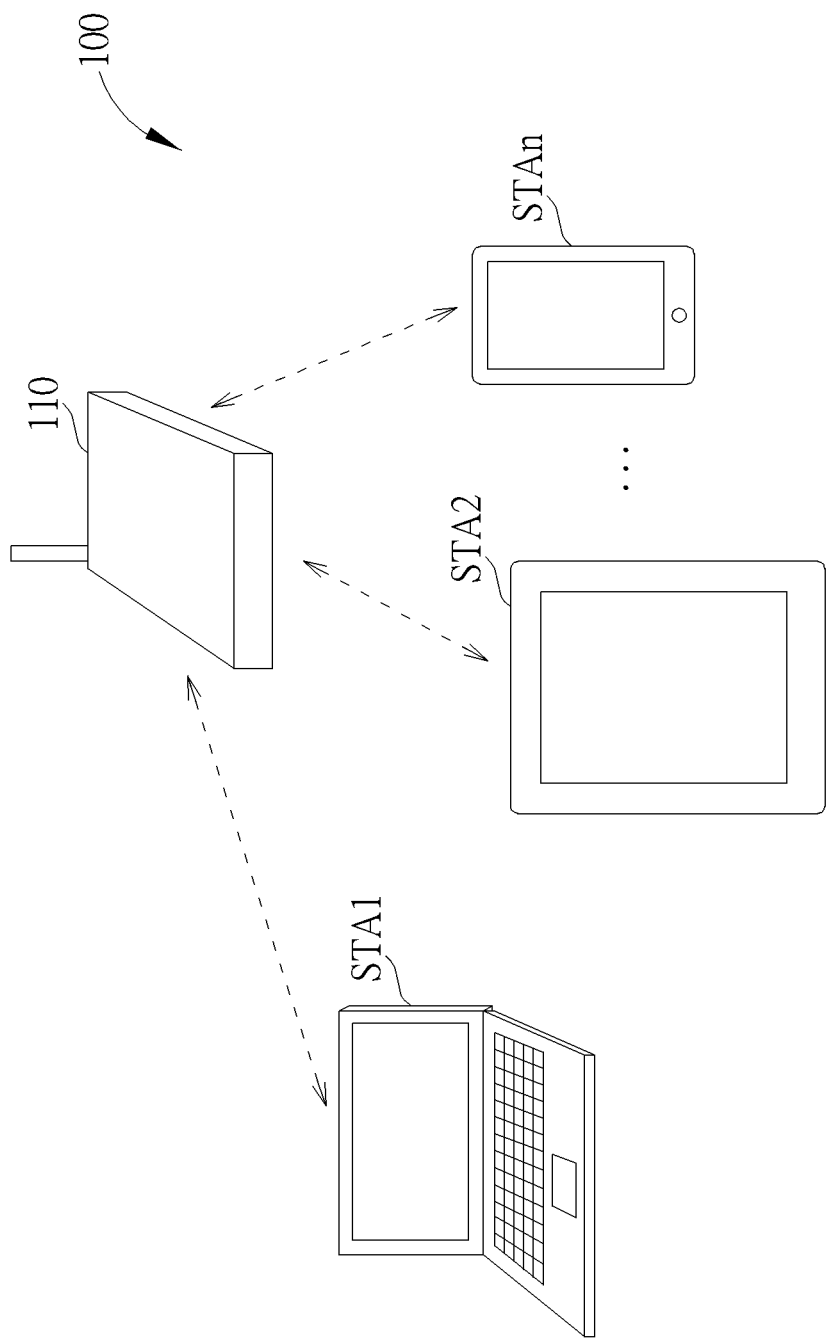
FIG. 1 is a diagram illustrating a wireless communication system according to one embodiment of the present invention.

Please refer to FIG. 1, which is a diagram illustrating a wireless communication system 100 according to one embodiment of the present invention. As shown in FIG. 1, the wireless communication system 100 comprises an access point (AP) 110 and a plurality of stations STA1-STAn. In this embodiment, the AP 110 is wirelessly connected to the stations STA1-STAn, and allows the stations STA1-STAn to connect to a wired network using WiFi or other related standards; and the stations STA1-STAn can be any client device such as notebook, laptop, smartphone, tablet or any other electronic device capable of wirelessly connecting to the AP 110.

In this embodiment, the AP 110 pre-stores one or more rosters, and each roster has a roster number and a roster length, wherein the roster length is a number of time slots.

Figure 2:
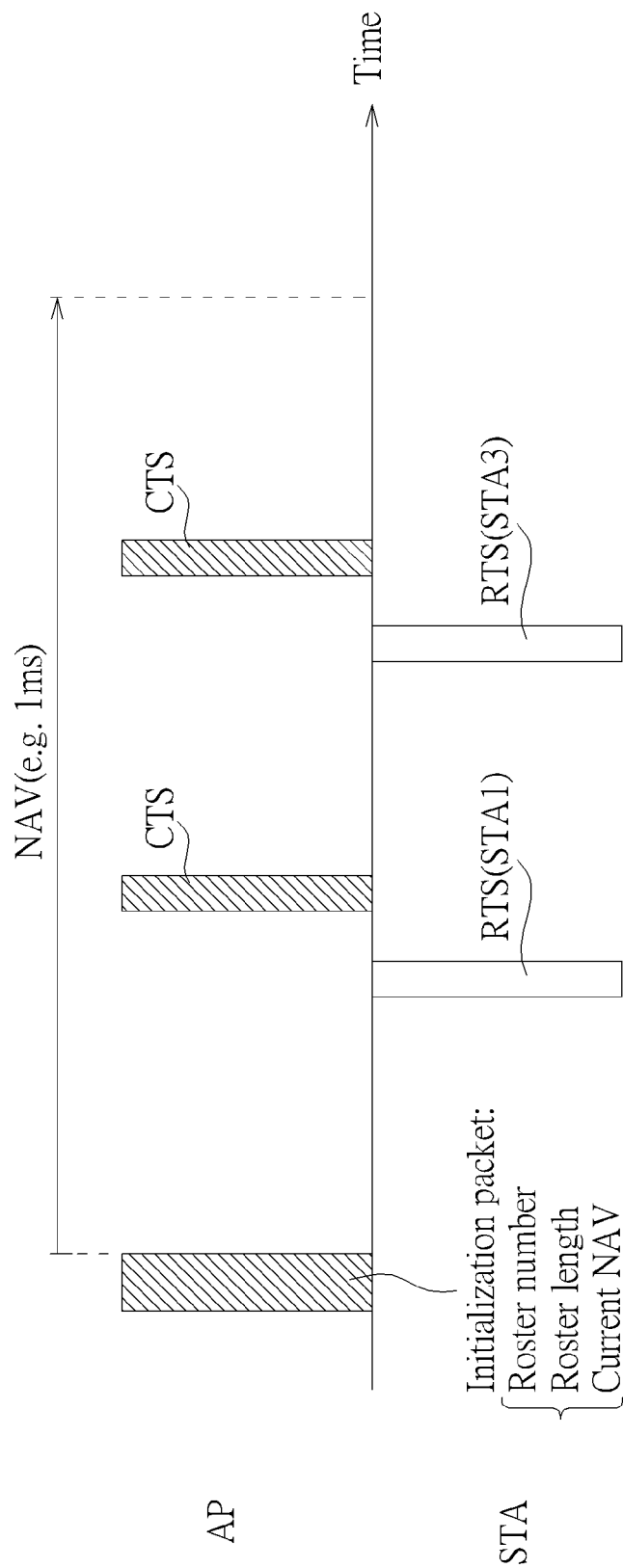
FIG. 2 is a diagram illustrating a setup mode of the wireless communication system according to one embodiment of the present invention.

Please refer to FIG. 2, which is a diagram illustrating a setup mode of the wireless communication system 100 according to one embodiment of the present invention. Referring to FIG. 2, when the AP 110 operates in the setup mode, the AP 110 broadcasts an initialization packet or sequence of packets, where the initialization packet or sequence comprises a roster number, roster length and a current network allocation vector (NAV) which may be regarded as duration of the setup mode. In the following description, it is assumed that the roster number is "1", the roster length is 30, and the NAV may be 1 ms, but it is not a limitation of the present invention.

After the stations STA1-STAn receive the initialization packet or sequence, for each station, if the station wants to send a data packet to the AP 110, the station may select a random time slot within the roster length, then sends a request to send (RTS) with information of the selected time slot, and when the AP 110 accepts the RTS/selected time slot, the AP 110 marks the selected time slot as assigned and sends a clear to send (CTS) to the station. For example, if the stations STA1 and STA3 want to send data packet to the AP 110, then the station STA1 may select a time slot #2 and send a RTS with the information of the time slot #2 to the AP 110, and the AP 110 receives the RTS from the station STA1 and determines if the time slot #2 is allowed to be used by STA1 for transmitting data packet, and if the time slot #2 is accepted by the AP 110, the AP 110 will mark the time slot #2 as assigned and send the CTS to the station STA1 to confirm the time slot #2 selected by the station STA1; and after receiving the CTS, the station STA1 also marks the time slot #2 as an assigned time slot to STA1. Similarly, the station STA3 may select a time slot #8 and send a RTS with the information of the time slot #8 to the AP 110, and the AP 110 receives the RTS from the station STA3 and determines if the time slot #8 is allowed to be used by STA3 for transmitting data packet, and if the time slot #8 is accepted by the AP 110, the AP 110 will mark the time slot #8 as assigned and send the CTS to the station STA3 to confirm the time slot #8 selected by the station STA3; and after receiving the CTS, the station STA3 also marks the time slot #8 as an assigned time slot to STA3.

In the embodiment shown in FIG. 2, both the stations STA1 and STA3 confirm the time slots with the AP 110, therefore, each of the stations STA1 and STA3 is allowed to transmit a data packet to the AP 110 when the AP 110 operates in the data mode following the setup mode. It is noted that in the setup mode, in this embodiment, the stations STA1 and STA3 do not transmit any data packet to the AP 110.

Figure 3:
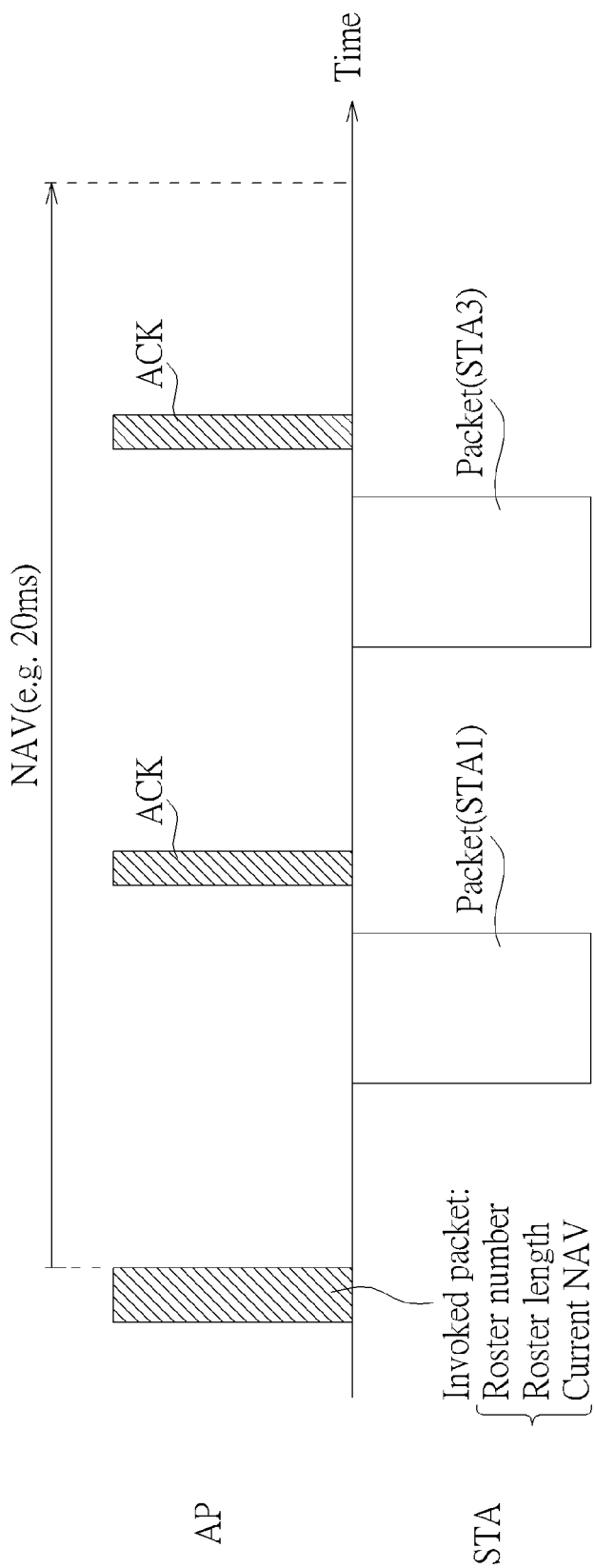
FIG. 3 is a diagram illustrating a data mode of the wireless communication system, following the setup mode shown in FIG. 2, according to one embodiment of the present invention.

Refer to FIG. 3, which is a diagram illustrating a data mode of the wireless communication system 100, following the setup mode shown in FIG. 2, according to one embodiment of the present invention. Referring to FIG. 3, when the AP 110 operates in the data mode, that is the AP 110 invokes a roster (e.g. the roster number "1" mentioned above), the AP 110 broadcasts an invocation signal or sequence, where the invocation signal or sequence comprises a roster number, roster length and a current network allocation vector (NAV) which may be regarded as a duration of this instance of the data mode. In the following description, it is assumed that the roster number is "1", the roster length is 30, and the NAV may be 20 ms, but it is not a limitation of the present invention.

After the stations STA1 and STA3 receive the i invocation packet, each station directly uses the time slot selected for the roster number in the setup mode to transmit the data packet to the AP 110. For example, after receiving the invocation packet or sequence having the information of the roster number "1", the station STA1 directly uses the time slot #2 selected for the roster number "1" in the setup mode to transmit the data packet to the AP 110; and after receiving the data packet from the station STA1, the AP 110 responds with an acknowledgement ACK (if necessary under the acknowledgement policy in operation). Similarly, after receiving the invocation packet or sequence having the information of the roster number "1", the station STA3 directly uses the time slot #8 selected for the roster number "1" in the setup mode to transmit the data packet to the AP 110; and after receiving the data packet from the station STA3, the AP 110 also responses an acknowledgement ACK. While STA1 transmits its packet, STA3 (and all other STAs following STA1 in this instance of the roster data phase) decodes the packet duration field of STA1's packet and freezes its time countdown: that is, STA3 (and any other STA) does not count down backoff slots for that duration. (In this way, the establishment and assignment of "time slots" for use in the data phase of the roster system may be understood as reserving time slots out of the time that is unused by actual data transmissions: time slots that would ordinarily be used as backoff slots.)

Here and throughout the present disclosure, the use of "time slot" should be taken as equivalent to "available backoff slot". Common wireless protocols, including notably IEEE 802.11, include additional inter-frame-spaces of varying lengths before backoff slots to facilitate operations such as clear-channel-assessment ("CCA"), transmitter-to-receiver and receiver-to-transmitter turnaround time, and others. These (with appropriately modified durations) may also be usefully used in combination with the present invention. The essential characteristic of the present invention is that in the available backoff slots, there can be no collisions between devices that participate in the disclosed protocol and that can hear each other's transmissions.

Figure 4:
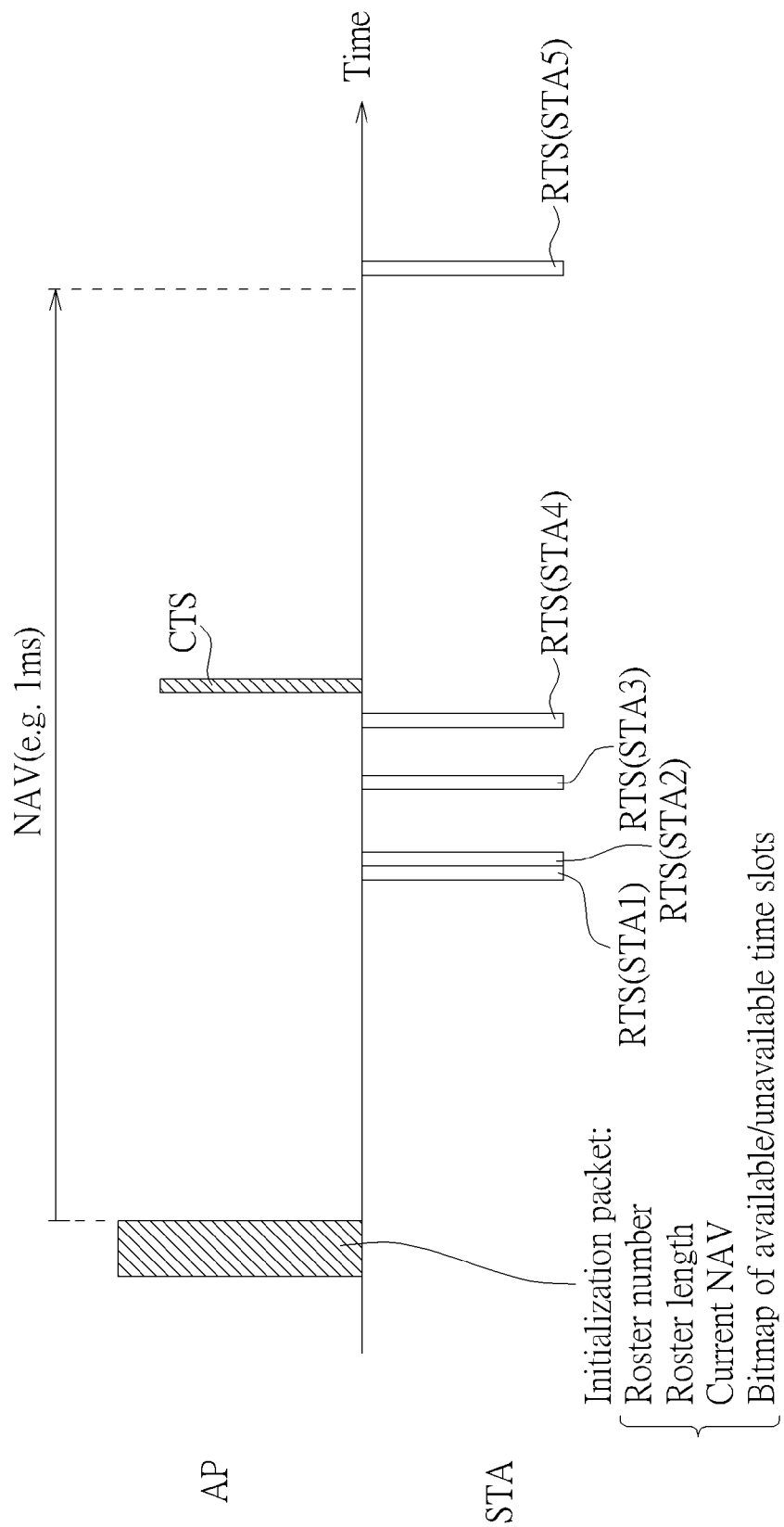
FIG. 4 is a diagram illustrating a setup mode of the wireless communication system according to another embodiment of the present invention.

Please refer to FIG. 4, which is a diagram illustrating a setup mode of the wireless communication system 100 according to another embodiment of the present invention. Referring to FIG. 4, when the AP 110 operates in the setup mode, the AP 110 broadcasts an initialization packet or sequence, where the initialization packet or sequence comprises a roster number, roster length, a current network allocation vector (NAV) which may be regarded as a duration of the setup mode, and a bitmap of available/unavailable time slots. In the following description, it is assumed that the roster number is "2", the roster length is 40, the NAV may be 1 ms, and the available time slots are #10-#30, but it is not a limitation of the present invention.

After the stations STA1-STAn receive the initialization packet or sequence, for each station, if the station wants to send a data packet to the AP 110, the station may select a random unassigned time slot within the roster length, then send a RTS in the selected time slot, and if the AP 110 accepts the RTS/selected time slot, the AP 110 marks the used time slot as assigned and sends a CTS to the station. For example, assuming that the stations STA1-STA5 want to send data packet to the AP 110, in FIG. 4, if the station STA2 sends the RTS too soon after the RTS sent by the station STA1, then the collision occurs and the AP 110 will not receive the RTS sent by the stations STA1 and STA2. Then, the station STA4 may select a time slot #15 and send a RTS with the information of the time slot #15 to the AP 110, and the AP 110 receives the RTS signal from the station STA4 and if STA4's request for time slot #15 is accepted by the AP 110, the AP 110 will send the CTS to the station STA4 to confirm the time slot #15 selected by the station STA4. (The AP may choose to decline a request by a STA for a time slot for any of a variety of reasons, including without limitation that the same STA has already been granted enough other time slots, and that the same STA has previously transmitted an inadequately high priority class of traffic.) In addition, if the station STA5 sends a RTS when the NAV is expired (i.e. over 1 ms), the AP 110 will not send the CTS to the station STA5.

In the mode described above, the bitmap of unassigned slots may be determined in any way. For example, and without limitation, the AP may determine currently active STAs and communicate individually with each STA by other means to pre-assign time slots; or the AP may reserve time slots for its own use, or the AP may choose to reserve time slots for possible future use (for example for possible future requests for time slots for high priority traffic), or any combination of these.

In the embodiment shown in FIG. 4, only the station STA4 establishes the time slot with the AP 110, therefore, the station STA4 is allowed to transmit a data packet to the AP 110 when the AP 110 operates in the data mode following the setup mode, but the stations STA1-STA3 and STA5 are not allowed to transmit data packets to the AP 110. It is noted that in the setup mode, the stations STA1-STA5 do not transmit any data packet to the AP 110.

Figure 5:
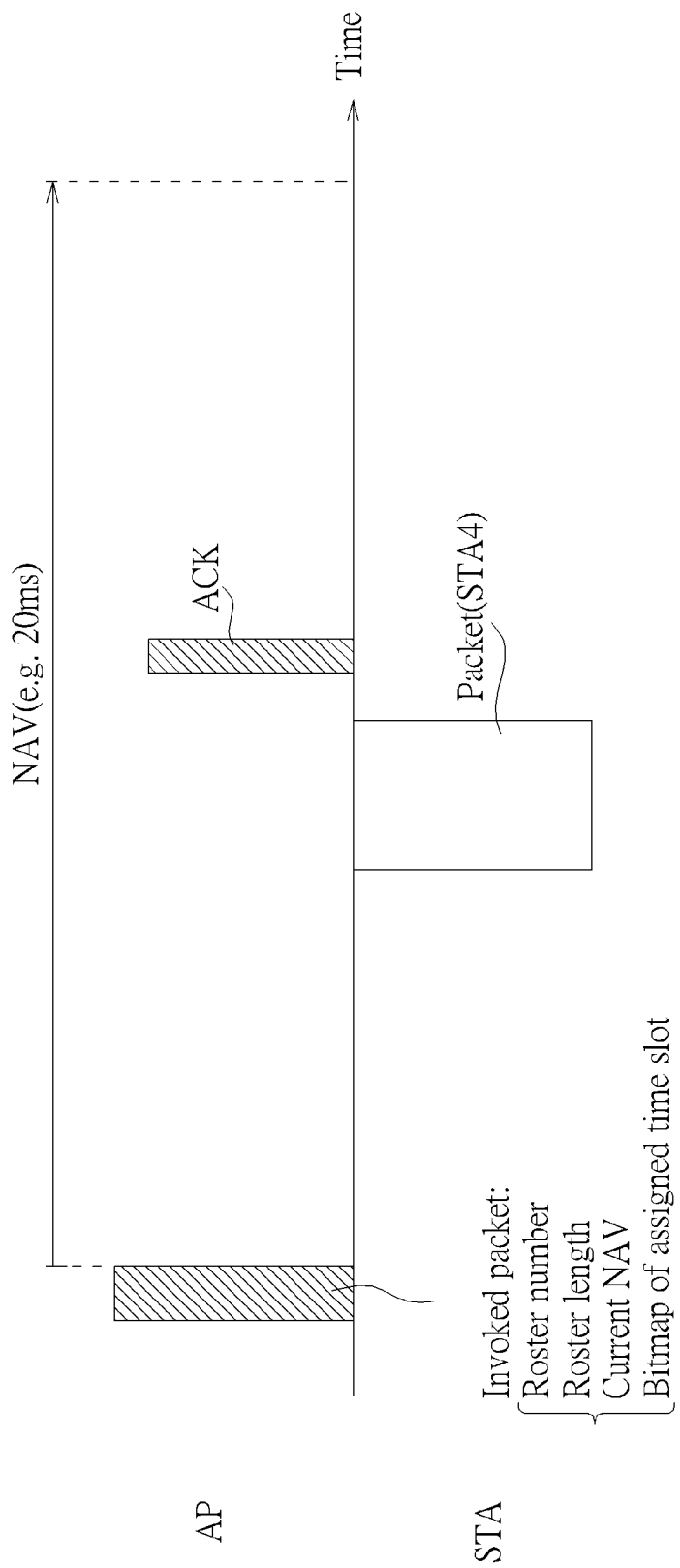
FIG. 5 is a diagram illustrating a data mode of the wireless communication system, following the setup mode shown in FIG. 4, according to one embodiment of the present invention.

Refer to FIG. 5, which is a diagram illustrating a data mode of the wireless communication system 100, following the setup mode shown in FIG. 4, according to one embodiment of the present invention. In FIG. 5, when the AP 110 operates in the data mode, that is the AP 110 invokes a roster (e.g. the roster number "2" mentioned above), the AP 110 broadcasts an invocation signal or sequence, where the invocation signal or sequence comprises a roster number, a roster length, a current network allocation vector (NAV) which may be regarded as a duration of the data mode, and a bitmap of the assigned time slots. In the following description, it is assumed that the roster number is "2", the roster length is 40, and the NAV may be 20 ms, but it is not a limitation of the present invention.

After the station STA4 receives the invoked packet having the information of the roster number "2", the station STA4 directly uses the time slot #15 selected in for the roster number "2" in the setup mode to transmit the data packet to the AP 110; and after receiving the data packet from the station STA4, the AP 110 responses an acknowledgement ACK, if required by the acknowledgement policy in use. In addition, because the stations STA1-STA3 and STA5 did not confirm any time slot with the AP 110 in the setup mode, the stations STA1-STA3 and STA5 will not transmit any data packet to the AP 110 in the data mode.

Briefly summarized, in the embodiments shown in FIGS. 2-5, when a station wants to send a data packet to the AP 110 within the roster mode of operation, the station needs to book a time slot of a roster of the AP 110 in the setup mode first, then the station is allowed to transmit the data packet to the AP 110 in the roster data mode. By using the access method described above, the collision probability can be reduced or eliminated when many stations want to transmit data packets to the AP 110.

In addition, in the embodiments shown in FIGS. 2-5, when a station books a time slot of a roster of the AP 110 in the setup mode, the station is allowed to transmit one data packet to the AP 110 in the data mode. The AP may invoke a roster many times: that is, the roster initialization phase may be a procedure carried out once, while the data mode may be entered many times. In this way, the overhead of the initialization phase may be amortized over many data mode phases.

Figure 6:
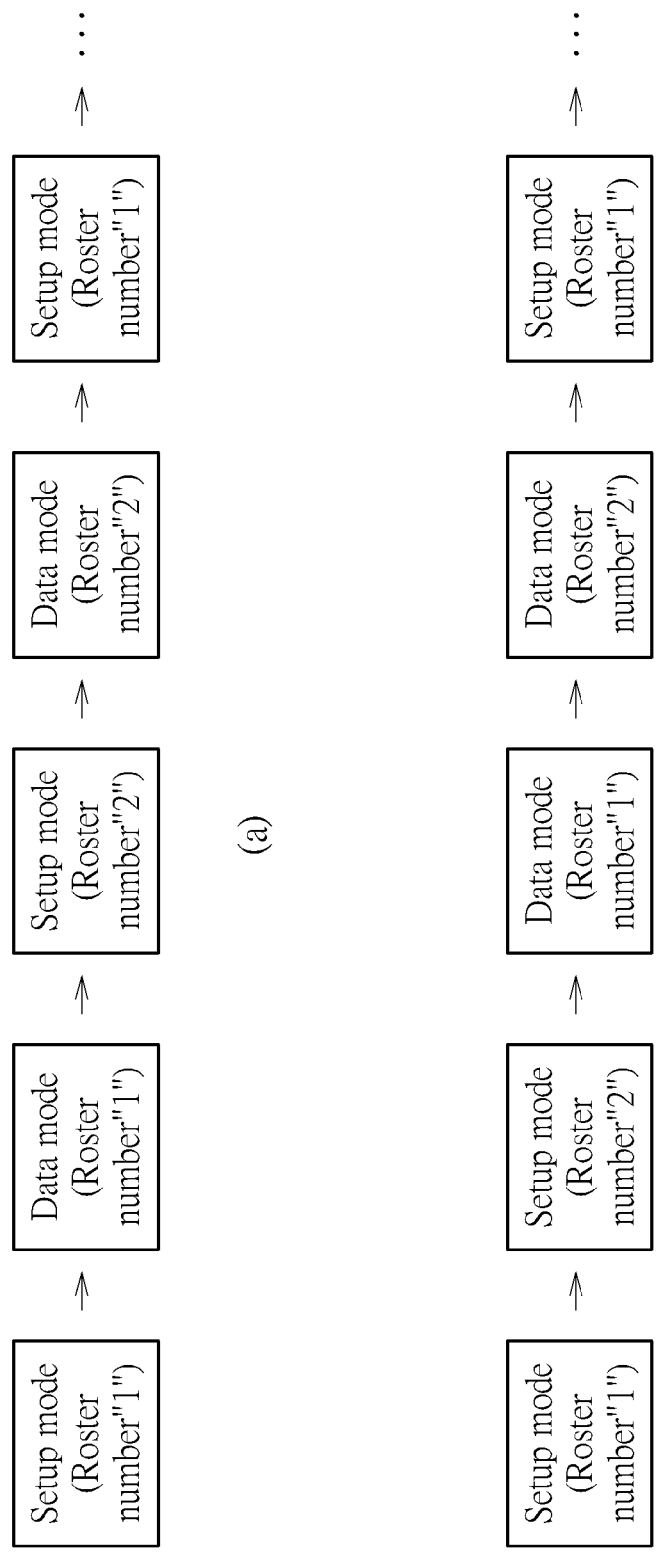
FIG. 6 is a diagram illustrating two executing sequences of the setup mode and the data mode according to one embodiment of the present invention.

In one embodiment, the data mode immediately follows the setup mode for the same roster number; but in another embodiment, a setup mode for a second roster number immediately follows a setup mode for a first roster number. For example, in FIG. 6, assume that the AP 110 has two rosters having roster numbers "1" and "2", the executing sequence may be setup mode for roster number "1", data mode for roster number "1", setup mode for roster number "2", and data mode for roster number "2", . . . , and so on (FIG. 6 (a)); and alternatively the executing sequence may be setup mode for roster number "1", setup mode for roster number "2", data mode for roster number "1", and data mode for roster number "2", . . . , and so on (FIG. 6 (b)). It is noted that the executing sequence shown in FIG. 6 is for illustrative purposes only, as long as the data mode follows the setup mode for the same roster number, the executing sequence may have other arrangements. Similarly, the network protocol may have many other modes of operation, and may intersperse uses of roster initialization and roster data modes among unrelated modes of operation. These alternative designs shall fall within the scope of the present invention.

In one embodiment, a roster length of a roster may not be always the same, that is the roster length can be changed or re-determined. In addition, a station may book many time slots in any roster, and may book time slots of two or more rosters. These alternative designs shall fall within the scope of the present invention.

In the embodiments shown in FIG. 2 and FIG. 4, the stations send the RTS to the AP 110 first, and wait for the confirmation (s) of the AP 110 in the setup mode. However, in another embodiment of the present invention, the AP 110 may actively poll or ask one or more specific stations to join a roster, and arrange these specific stations to have high priority time slot (s). This alternative design shall fall within the scope of the present invention.

In addition, in the embodiments shown in FIG. 2 and FIG. 4, in a setup mode, the AP 110 only broadcast the initialization packet once. However, in another embodiment, upon expiration of the NAV set in the setup mode, some stations may have assigned time slots, and the AP 110 may subsequently send a broadcast packet which lists the same roster number, and optionally includes a bitmap or other signaling of all of the time slots that have already been assigned in the roster. Then, the stations that do not have assigned time slots in the roster may choose one time slot randomly, but avoiding the already assigned time slots.

In another embodiment, the participating STAs do not have to belong to the same network as the AP 110 (e.g., in the IEEE 802.11 protocol, do not have to belong to the same "Basic Service Set" ("BSS")). Such devices may exchange RTS and CTS packets with the AP 110 to book slots in the roster, without exchange of data and without the need for association, authentication, and/or the various other setup steps that commonly occur prior to full data exchange. Since the roster method of the present invention is primarily directed at reducing protocol overhead due to collisions or the possibility of collisions, and since collisions may occur between devices whether or not those devices are part of the same network/BSS, it may be advantageous for the AP 110 to permit devices that are not a part of the AP 110's BSS to book slots in the roster. Such slots may be used by the relevant STAs to transmit to their own respective APs.

Figure 7:
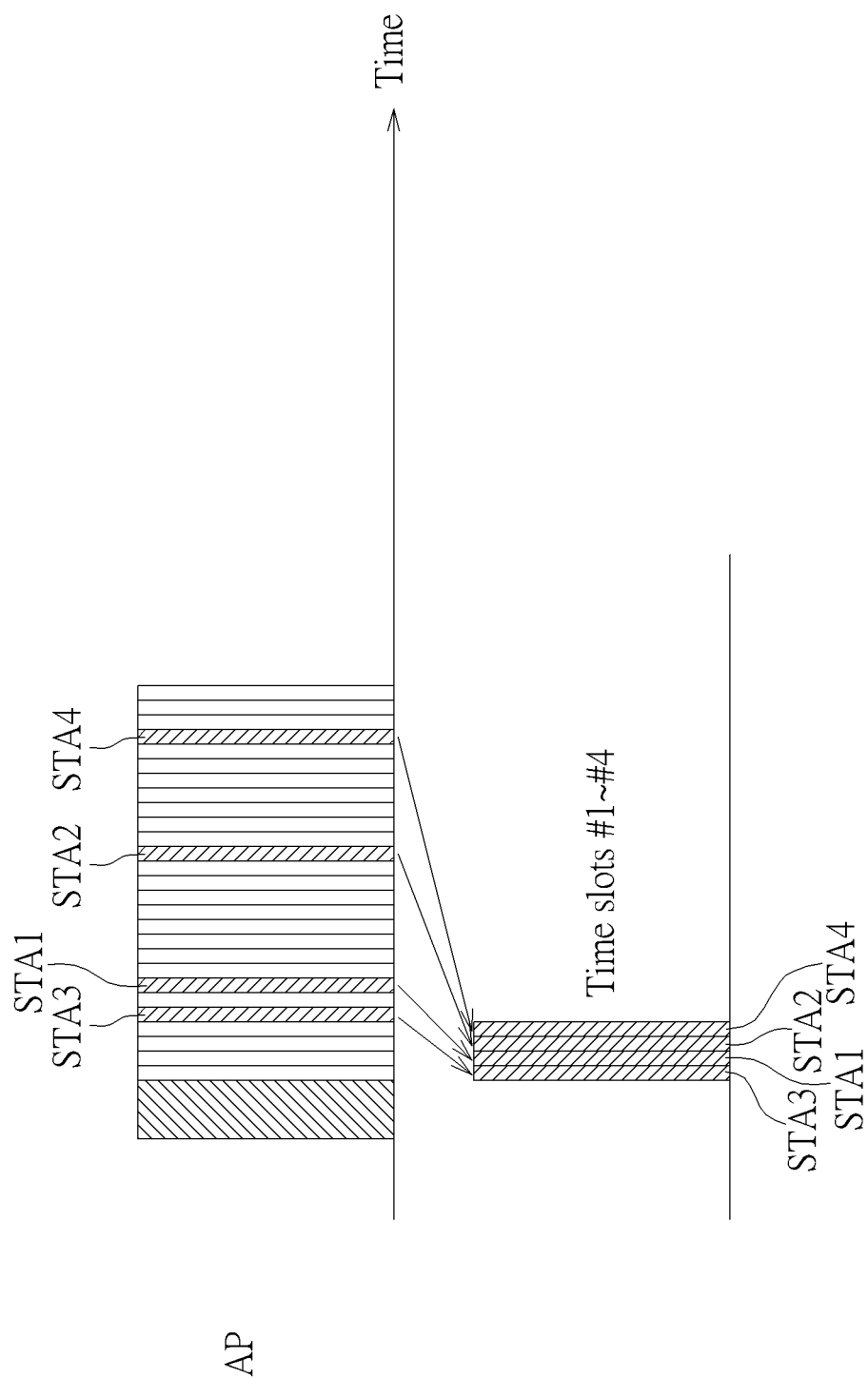
FIG. 7 is a diagram illustrating the roster compression according to one embodiment of the present invention.

In the setup mode, if the time slots selected by the stations are dispersed, that is many unselected time slots are within the selected slots, the data transmission efficiency may be lowered. To solve this problem, the AP 110 may compress the roster and reassign the time slots for the stations. In detail, refer to FIG. 7, which is a diagram illustrating the roster compression according to one embodiment of the present invention. As shown in FIG. 7, after receiving the initialization packet or sequence from the AP 110, the stations STA3, STA1, STA2 and STA4 successfully book the time slots with the AP 110. Then, because the selected time slots are dispersed, the AP 110 may reassign the time slots for the stations STA3, STA1, STA2 and STA4 to make the stations have closer time slots. In this embodiment, the stations STA3, STA1, STA2 and STA4 are assigned to have new time slots #1-#4 for the same roster or another roster, and the AP 110 will record these new assigned time slots and notify the stations STA3, STA1, STA2 and STA4.

In addition, if one station books a time slot in the setup mode, but does not transmit data packet to the AP 110 in the data mode, the AP 110 may record this situation for further use. For example, if that station fails to use its assigned slot sufficiently often, as determined by the AP 110, the AP 110 may mark the slot as not-to-be-used in a separate bitmap included in the roster invocation; then other participating stations treat the time slot so marked as deleted from the roster during this invocation of the roster. For example, if another station has been assigned time slot #5 in that roster, and notes from the roster invocation that time slot #3 is to be considered unused during this invocation of the roster, the station in this embodiment would consider it had been assigned and could use time slot #4 instead of time slot #5. This provides one way for the AP 110 to adapt the roster to current usage patterns, in which a station that previously transmitted data stops transmitting.

In the above-mentioned embodiments, when a station wants to send a data packet to the AP 110 within the roster mode of operation, the station needs to book a time slot of a roster of the AP 110 in the setup mode first, then the station is allowed to transmit the data packet to the AP 110 in the roster data mode. By using the access method described above, the collision probability can be reduced or eliminated when many stations want to transmit data packets to the AP 110. However, in a situation that two or more stations are hidden nodes to each other, that is the two stations cannot hear each other, there may be a collision problem in the data mode. For example, if stations STA1 and STA2 are hidden nodes, and the station STA1 books the time slot #5 of a roster, and the station STA2 books the time slot #6 of a roster in the setup mode; then in the data mode, when the station STA1 counts down to five and starts to transmit the data packet to the AP 110, because the station STA2 cannot receive the information from the station STA1 and does not know that the station STA1 is transmitting data, the station STA2 will not freeze its time countdown and start to transmit data at the time slot #6, causing the collision issue. Therefore, in the following description, an embodiment is provided to solve this hidden nodes issue.

Figure 8:
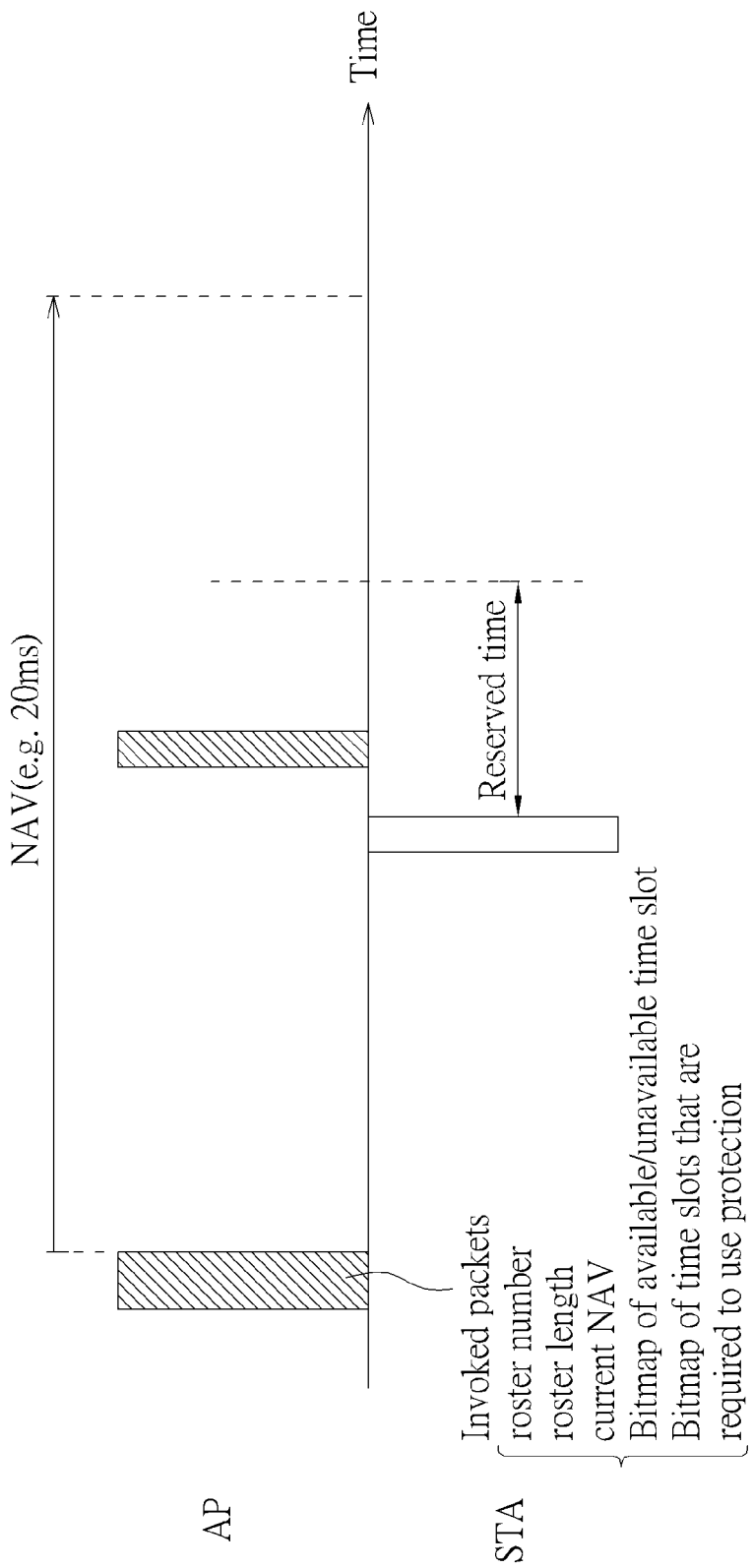
FIG. 8 is a diagram illustrating a data mode according to another embodiment.

Refer to FIG. 8, which is a diagram illustrating a data mode according to another embodiment. As shown in FIG. 8, the AP 110 broadcasts an invocation signal or sequence, where the invocation signal or sequence comprises a roster number, roster length and a current network allocation vector (NAV) which may be regarded as a duration of this instance of the data mode, a bitmap of available/unavailable time slots, and a bitmap of time slots that are required to use protection. The "bitmap of time slots that required to use protection" refers to the time slots selected by the hidden nodes in the setup mode. For example, if the stations STA1 and STA2 are hidden nodes to each other, and the station STA1 books the time slot #5 of a roster, and the station STA2 books the time slot #6 of a roster in the setup mode, then the "bitmap of time slots that required to use protection" in the invocation signal or sequence comprises time slot #5 and time slot #6. Then, when the station STA1 counts down to five (at time slot #5), the station STA1 sends a CTS-to-self packet to reserve a duration for data transmission, and the AP 110 will immediately broadcast a signal (such as another CTS-to-self packet) to notify all the other stations that the duration has been reserved for data transmission, thereby the other stations will freeze its time countdown. By using this embodiment, the station STA2 (the hidden node of the station STA1) will not transmit data in the reserved duration, and the collision issue can be prevented.

Figure 9:
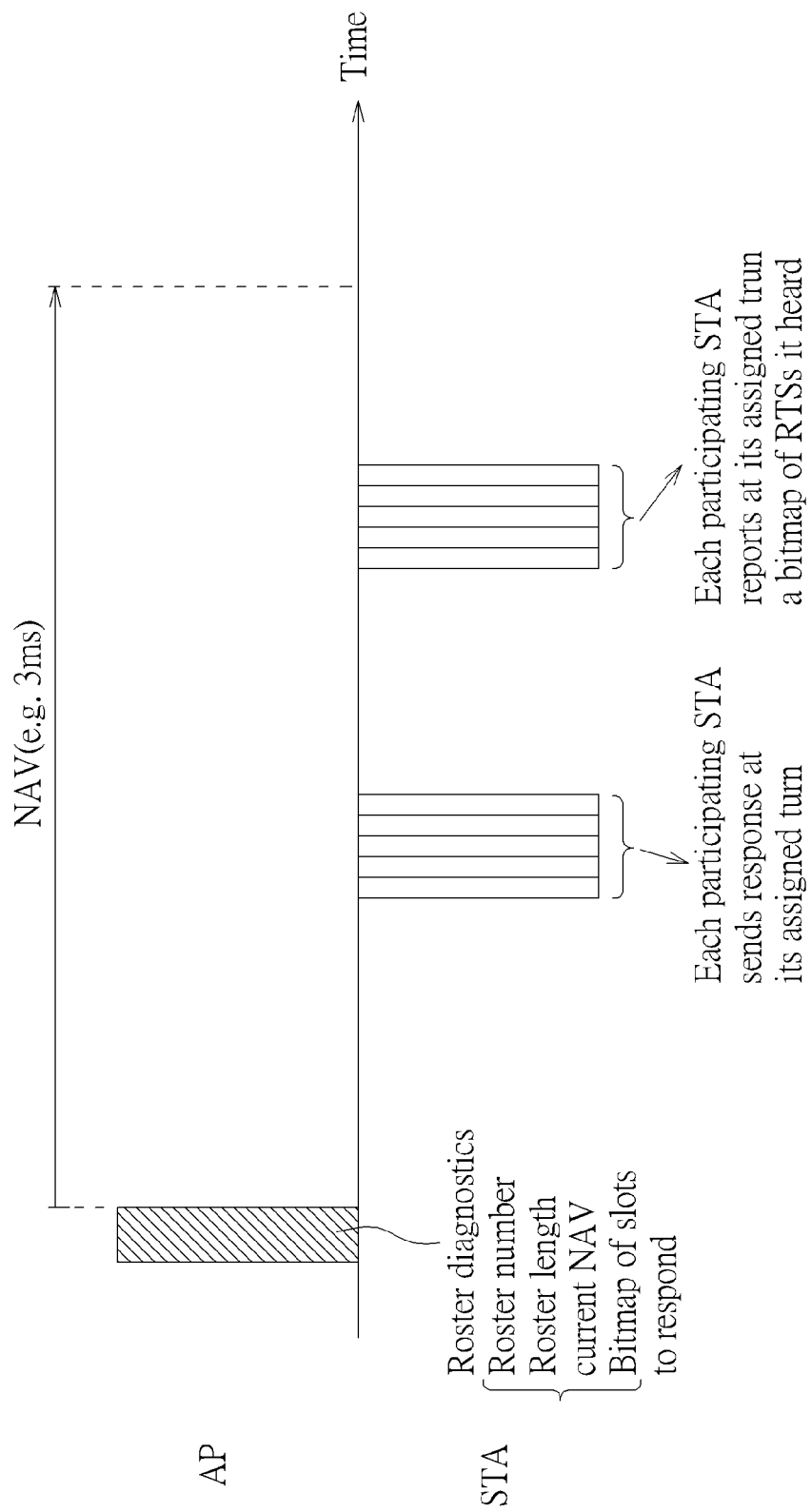
FIG. 9 is a diagram illustrating how to diagnose the hidden nodes according to one embodiment of the present invention.

FIG. 9 is a diagram illustrating how to diagnose the hidden nodes according to one embodiment of the present invention, where this embodiment can be regarded as an extra setup step after each participating station booked a time slot of a roster. Refer to FIG. 9, the AP 110 broadcasting a diagnostic signal or sequence, where the diagnostic signal or sequence comprises a roster number, roster length and a current NAV and a bitmap of time slots to respond for the participating stations. When the participating stations receive the diagnostic signal or sequence, each participating station sends a response (e.g. RTS) at its assigned turn. Then, each participating station reports at its assigned turn a bitmap of RTSs it heard. In detail, assuming that the stations STA1-STA5 send the RTSs, respectively, but the stations STA3 and STA5 report that they merely heard RTSs of STA1-STA2 and STA4, then the AP 110 knows that the stations STA3 and STA5 are hidden nodes with respect to each other.

Figure 10:
FIG. 10 shows the CTS-to-self packet and the roster invocation packet.

The above-mentioned initialization signal, invocation signal or sequence broadcasted by the AP 110 may have one or more packets. For example, the invocation signal may have a CTS-to-self packet and the roster invocation packet, where the CTS-to-self packet is used to notify the legacy devices to reserve the NAV, and the roster invocation packet comprises the roster number, roster length etc. as mentioned above. FIG. 10 shows the CTS-to-self packet and the roster invocation packet, where a short inter-frame spacing (SIFS) is between the CTS-to-self packet and the roster invocation packet. In this embodiment, there is no requirement that the two packets must be sent at the same data rate: the CTS-to-self packet may for example be sent at the lowest data rate (corresponding to the longest range), while the roster invocation packet (which is addressed only to devices participating in the roster, which is possibly a much smaller set of devices) may be sent at a higher data rate.

Figure 11:
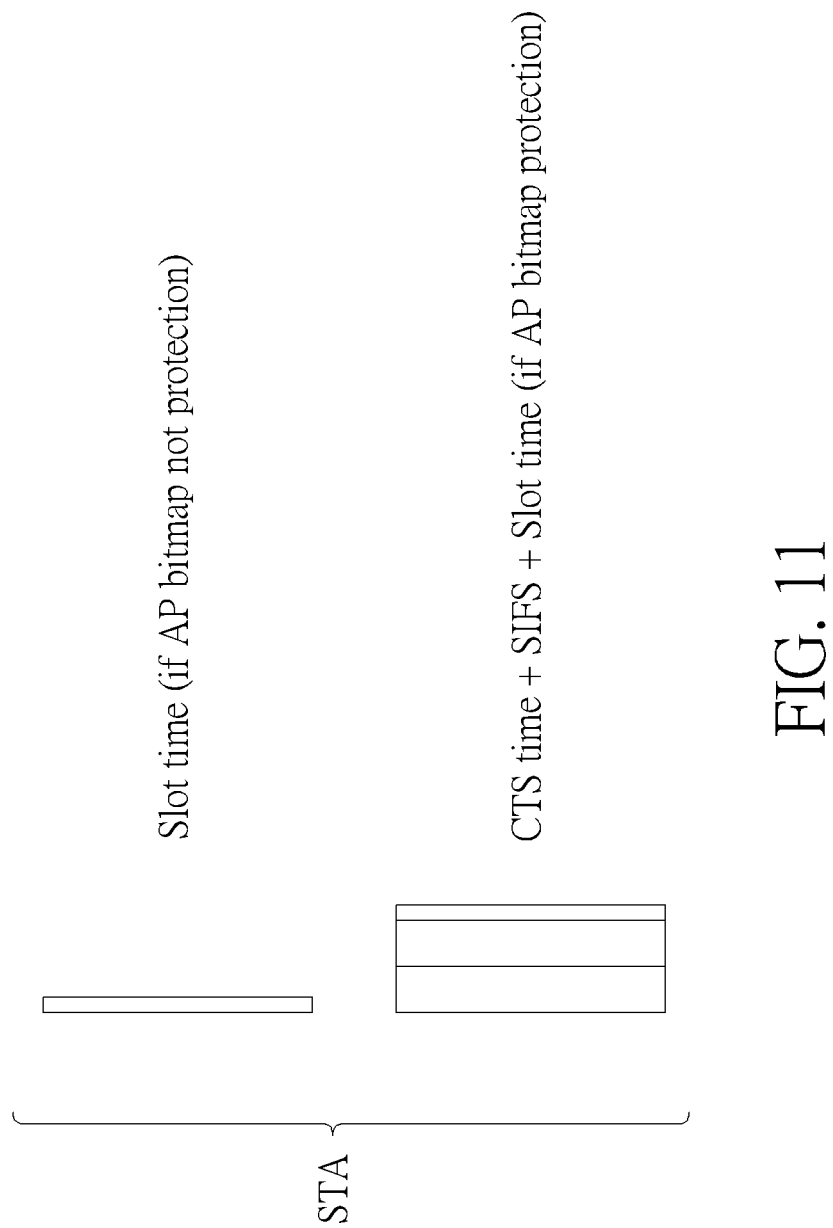
FIG. 11 shows different time countdowns according to one embodiment of the present invention.

In addition, in the embodiments shown in FIG. 8, because when the hidden node will send a CTS-to-self packet to reserve a duration for data transmission before sending data at an assigned slot, therefore, the time countdown for the other stations may be different at this assigned slot. In detail, refer to FIG. 11, if "bitmap of time slots that required to use protection" sent by the AP 110 comprises time slot #3 and time slot #4, then when the stations count down, the time countdown for the slots #3 and time slot #4 comprise a CTS time, a SIFS and a slot time, and the other time slots merely comprise a slot time. This permits all stations to allow an appropriate amount of time to elapse before judging a slot marked as to-be-protected as not used.

Briefly summarized, in wireless communication system of the present invention, when a station wants to transmit a data packet to an AP within a roster, the station needs to confirm a time slot of a roster with the AP in the setup mode first, then in data mode the station directly uses the time slot determined in the setup mode to transmit the packet to the AP. By using the method described above, the collision probability can be reduced or (usually) eliminated when many stations want to transmit the data packets to the AP, and a roster length of a roster can be set smaller to avoid too many unused time slots in the data mode, and the overall throughput can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication system under a contention-based protocol, comprising:
   an access point; and
   at least one station, for wirelessly communicated with the access point under the contention-based protocol;
   wherein the access point broadcasts an initialization packet or sequence of packets to establish a roster, and both the access point and the at least one station confirm a specific time slot of a plurality of time slots in the roster for transmitting a packet from the station to the access point; and the station subsequently uses the specific time slot to transmit the packet to the access point.

2. The wireless communication system of claim 1, wherein the access point re-assigns another specific time slot for the at least one station, and the station uses the another specific time slot to transmit the packet to the access point.

3. The wireless communication system of claim 2, wherein the another specific time slot is shorter than the specific time slot.

4. The wireless communication system of claim 1, wherein the at least one station comprises a plurality of stations, and after the stations confirm a plurality of specific time slots in the roster with the access point, the access point re-assigns each of the specific time slots for the stations to make the stations have closer time slots.

5. The wireless communication system of claim 1, wherein the access point broadcasts an invocation signal or sequence to initiate data packet transmission, wherein the invocation signal or sequence comprises information of the roster number, the roster length and a bitmap of time slots that are required to use protection.

6. The wireless communication system of claim 5, wherein the bitmap of time slots that are required to use protection comprises the time slots that are reserved by two more hidden stations/hidden nodes.

7. The wireless communication system of claim 5, wherein when the bitmap of time slots that are required to use protection comprises the specific time slot, the station sends a CTS-to-self packet to reserve a duration, the access point notifies all the stations that the duration is reserved, and then the station sends the data packet to the access point.

8. A wireless communication method of a wireless device using a contention-based protocol, comprising:
   using an initialization packet or sequence to enable an establishment of a specific time slot of a roster;
   establishing/confirming the specific time slot of a plurality of time slots in the roster via a wireless medium; and
   using the specific time slot to transmit a packet via the wireless medium;

wherein the step of using the specific time slot to transmit the packet comprises:
receiving an invocation signal or sequence to initiate data packet transmission, wherein the invocation signal or sequence comprises information of a roster number, a roster length and a bitmap of time slots that are required to use protection.

9. The wireless communication method of claim 8, further comprising:
re-establishing/re-confirming another specific time slot; and
using the another specific time slot to transmit the packet via the wireless medium.

10. The wireless communication method of claim 9, wherein the another specific time slot is shorter than the specific time slot.

11. The wireless communication method of claim 8, further comprising:
establishing/confirming a plurality of specific time slot of the plurality of time slots in the roster via the wireless medium;
re-establishing/re-confirming each of the specific time slots to make the reassigned time slots are closer to each other.

12. The wireless communication method of claim 8, wherein
the step of using the specific time slot to transmit the packet further comprises:
when the bitmap of time slots that are required to use protection comprises the specific time slot, sending a CTS-to-self packet to reserve a duration, notifying all stations that the duration is reserved, and then sending the packet to an access point.

13. The wireless communication method of claim 12, wherein the bitmap of time slots that are required to use protection comprises the time slots that are reserved by two more hidden stations/hidden nodes.

14. A wireless device using a contention-based protocol, the wireless device comprising:
a circuitry configured to
use an initialization packet or sequence to enable an establishment of a specific time slot of a roster
confirm the specific time slot of a plurality of time slots in the roster via a wireless medium;
utilize the confirmed specific time slot to transmit a packet via the wireless medium; and
receive an invocation signal or sequence to initiate data packet transmission, wherein the invocation signal or sequence comprises information of a roster number, a roster length and a bitmap of time slots that are required to use protection.

15. The wireless device of claim 14, wherein the circuitry is further configured to:
re-confirm another specific time slot; and
use the another specific time slot to transmit the packet via the wireless medium.

16. The wireless device of claim 15, wherein the another specific time slot is shorter than the specific time slot.

17. The wireless device of claim 14, wherein the circuitry is further configured to:
confirm a plurality of specific time slot of the plurality of time slots in the roster via the wireless medium;
re-confirm each of the specific time slots to make the reassigned time slots are closer to each other.

18. The wireless device of claim 14, wherein the circuitry is further configured to:
when the bitmap of time slots that are required to use protection comprises the specific time slot, send a CTS-to-self packet to reserve a duration, notify all stations that the duration is reserved, and then send the packet to an access point.

19. The wireless device of claim 18, wherein the bitmap of time slots that are required to use protection comprises the time slots that are reserved by two more hidden stations/hidden nodes.

* * * * *